(12) United States Patent
Bandy

(10) Patent No.: US 9,114,682 B1
(45) Date of Patent: Aug. 25, 2015

(54) STEERING FOR INDEPENDENT SUSPENSION SYSTEM

(71) Applicant: Ronald Scott Bandy, San Pablo, CA (US)

(72) Inventor: Ronald Scott Bandy, San Pablo, CA (US)

(*) Notice: Subject to any disclaimer, the term of this patent is extended or adjusted under 35 U.S.C. 154(b) by 0 days.

(21) Appl. No.: 14/246,108

(22) Filed: Apr. 6, 2014

(51) Int. Cl.
　　B62D 7/16　　(2006.01)
　　B60G 9/02　　(2006.01)
　　B60G 7/02　　(2006.01)

(52) U.S. Cl.
　　CPC　*B60G 9/027* (2013.01); *B60G 7/02* (2013.01); *B62D 7/16* (2013.01)

(58) Field of Classification Search
　　CPC ............ B62D 7/00; B62D 7/16; B60G 9/027; B60G 7/02
　　See application file for complete search history.

(56) References Cited

U.S. PATENT DOCUMENTS

| | | | | |
|---|---|---|---|---|
| 1,947,787 | A * | 2/1934 | MacPherson | 280/88 |
| 2,068,901 | A * | 1/1937 | Badertscher | 280/124.1 |
| 2,085,021 | A * | 6/1937 | Hickman | 280/89.12 |
| 2,152,506 | A * | 3/1939 | Thorne | 280/124.138 |
| 2,152,660 | A * | 4/1939 | Paton | 280/124.114 |
| 2,153,083 | A * | 4/1939 | Griswold | 280/86.753 |
| 2,225,966 | A * | 12/1940 | Beemer | 280/124.113 |
| 2,448,851 | A * | 9/1948 | Wharam et al. | 403/64 |
| 2,507,000 | A * | 5/1950 | Farmer | 280/638 |
| 2,806,712 | A * | 9/1957 | Cottrell | 280/93.508 |
| 2,840,385 | A * | 6/1958 | Heftler | 280/124.105 |
| 5,401,049 | A | 3/1995 | Richardson | |
| 5,529,316 | A | 6/1996 | Mattila | |
| 5,651,561 | A | 7/1997 | Tandy, Jr. et al. | |
| 7,350,792 | B1 | 4/2008 | Garman | |
| 8,387,998 | B2 | 3/2013 | Hinds | |

OTHER PUBLICATIONS

Torchmate, Torchmate TTB Ultra4 Build Thread, pirate4x4.com/General 4x4 Discussion, Oct. 14, 2010.
FJ40FORLIFE, Dana 60 king-pin high steer 5th bolt thread, pirate4x4.com/General 4x4 Discussion, Nov. 11, 2013.
Tech Tim, Steering for go-fast rigs, pirate4x4.com/General 4x4 Discussion, Oct. 13, 2011.
Bill Ansell, Crane High Clearance Alloy Steering Knuckles, BillaVista.com, 2008.
Kevin Blumer, Custom Ford Prerunner Trucks—Two For The Go, fourwheeler.com, Sep. 26, 2006.
Bajafand, "Single swing" I-bean steering pics and info, race-dezert.com, Mar. 22, 2009.

(Continued)

*Primary Examiner* — Paul N Dickson
*Assistant Examiner* — Timothy Wilhelm

(57) ABSTRACT

Disclosed herein is a novel steering system specifically designed to operate in conjunction with the powered version of the extreme-travel independent suspension system that is disclosed in the U.S. patent application Ser. No. 14/087,552. Based on a steering mechanism commonly found in off-road racing trucks built around Ford's twin I-beam front suspension system, this novel steering system comprises a type of swingset steering linkage structure. Unique features of this novel steering system include a right-angle bellcrank and swingset arm whereby the vertical bellcrank arm functions like the swingset arm. This novel steering system utilizes front or rear driver and passenger tie rods operating in coincidence with their counterpart suspension links to control the directional orientation of the steering or non-steering knuckles with minimal bump steer or change in toe throughout suspension travel, respectively.

7 Claims, 7 Drawing Sheets

(56) References Cited

OTHER PUBLICATIONS

David Kennedy, The First Long-Travel Suspension, Off-Road.com, Apr. 15, 2008.

4×4JUNKIE, Steering Tech—An in-depth discussion about TTB Steering and Alignment, therangerstation.com, Winter2008/2009.
Herb Adams, Chassis Engineering, HPBooks, 1992, pp. 52-54, Penguin Group, New York, USA.

* cited by examiner

STEERING FOR INDEPENDENT SUSPENSION SYSTEM

CROSS-REFERENCE TO RELATED APPLICATIONS

This application represents a novel steering system specifically designed to operate in conjunction with the powered version of the extreme-travel independent suspension system. The powered version of this suspension system is covered in U.S. patent application Ser. No. 14/087,552.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Disclosed in patent application Ser. No. 14/087,552 is a powered version of a novel independent suspension system. The novel suspension system is a type of double A-arm suspension system derived from Ford's twin I-beam front suspension system, this novel suspension system being covered in patent application Ser. No. 14/059,062. While the powered version introduces a unique means of transmitting power from a powertrain to the wheels, the suspension system lacks a means of controlling the directional orientation of the knuckles, the knuckles being rotatably attached to the wheels.

Given that many types of production-based vehicles are routinely used in industries that involve off-road driving, e.g., construction, farming and ranching, mining, forestry, gas and oil exploration, where many obstacles—e.g., boulders, fallen trees, ravines, cliffs—exceed the limits of suspension travel, then automobile manufacturers and numerous other industries would greatly benefit from a powered version of this novel long travel suspension system that possessed the ability to control the directional orientation of both the steering and non-steering knuckles, particularly for a four wheel drive (4WD) vehicle.

Controlling the directional orientation of the knuckles in a production-based vehicle equipped with front and rear independent suspension systems typically involves tie rods: in the case of the steerable (usually front) knuckles, the tie rods operate with other parts of a steering system; whereas in the case of the non-steerable (usually rear) knuckles, the tie rods operate with one of their ends being attached to a rigid body such as the frame, cross-member, or bracket assembly. Also, most 4WD vehicles equipped with a double A-arm front suspension system employ a steering system that utilizes a tie rod to transmit steering input from the frame to the steering knuckle. Bump steer is minimized by aligning the ends of the tie rods with the ends of the A-arms. The same technique holds for a double A-arm rear suspension system. Functionally, the ends of the tie rods comply with the same coincidence principle as do the ends of the axle shafts. So long as the ends of the tie rods are coincident with the ends of the A-arms throughout suspension travel, then the tie rods will move in concert with the A-arms and the steerable (front) knuckles can be turned with minimal bump steer while the non-steerable (rear) knuckles can be locked into a straight-ahead direction with minimal change in toe throughout suspension travel.

Off-road vehicles equipped with Ford's twin I-beam front suspension system employ a type of swingset steering system. Typical swingset steering systems include a steering box, swingset lever arms, draglinks, and tie rods, the number of each component used depending on the application. As a type of idler arm, the swingset lever arm hangs vertically downward such that the top end is pivotally attached to the frame or cross-member while the bottom end can swing laterally parallel to a line passing through the front wheels, the top end being attached to the frame or cross-member in the same position as is the frame end of one of the I-beams. The steering box is attached to the driver frame side in the same position as the frame end of say the second I-beam. In applications involving one swingset lever arm, the swingset lever arm is attached to the passenger frame side in the same position as is the frame end of say the one I-beam. The steering box transmits steering input to the swingset lever arm via a draglink and to the passenger knuckle via the second tie rod while the swingset lever arm transmits steering input to the driver knuckle via the one tie rod. In applications involving two swingset lever arms, one and the second swingset lever arms are located at the driver and passenger sides of the vehicle in the same positions as are the frame ends of one and the second I-beams, respectively. The steering box transmits steering input to one swingset lever arm via one draglink. The one swingset lever arm transmits steering input to the second swingset lever arm via a second draglink and to the passenger knuckle via the one tie rod while the second swingset lever arm transmits steering input to the driver knuckle via the second tie rod.

In principle a type of swingset steering system is suitable for the present invention so long as it's compatible with the suspension system covered in patent application Ser. No. 14/059,062. In particular, a swingset lever arm linkage arrangement operating in conjunction with a front tie rod arrangement that is coincident with the front upper and lower leading links can transmit steering input from a steering box to the steering knuckles with minimal bumpsteer throughout suspension travel. Meanwhile, a rear tie rod arrangement that is coincident with the rear upper and lower leading links can lock the non-steering knuckles into a straight-ahead orientation with minimal change in toe throughout suspension travel. Thusly, the present invention offers a steering system design based on a swingset lever arm linkage arrangement that cooperates with tie rods as a means of contrail the direction orientation of both the steering and non-steering knuckles in the powered version of the novel independent suspension system disclosed in patent application Ser. No. 14/087,552.

BRIEF SUMMARY OF THE INVENTION

The present invention represents a novel steering system design whose components include a Saginaw recirculating ball-type steering box, bellcrank, swingset arm, draglink, connector link, and tie rods. This design is based on a type of swingset lever arm linkage arrangement commonly found in off-road racing trucks. In particular, this design uses the same type of tie rod to control the directional orientation of both steering and non-steering knuckles. The steering and non-steering knuckles are associated with the independent suspension systems installed at both the front and rear ends of a vehicle, respectively.

The present invention also represents a steering system that:
is specifically designed to operate in conjunction with the powered version of the novel independent suspension system disclosed in U.S. patent application Ser. No. 14/087,552;
involves a steering circuit whereby steering input is transmitted from the firewall to the steering box via a steering shaft, then to the bellcrank via a draglink, then to the swingset arm via a connector link, and then the bellcrank and swingset arm transmit steering input to the front passenger and driver steering knuckles via tie rods, respectively;
employs a right-angle bellcrank comprised of two arms called horizontal and vertical arms. Originating at the driver frame side, the horizontal arm projects horizontally across to the passenger frame side while the vertical arm projects vertically downward to the ground. The vertical arm comprises the same features (i.e., size, dimensions, attachment points) as does the swingset arm;
employs one tie rod per wheel, whereby (1) the front driver or passenger tie rod is positioned at the front passenger or driver reverse power coupler in a manner such that the frame end of the front driver or passenger tie rod is coincident with the first ends of the front driver or passenger up er and lower leading links and the wheel end of the front driver passenger tie rod is coincident with ball joints; the ball joints serve to pivotally connect the second ends of the front driver or passenger upper and lower leading links to the top and bottom of the driver or passenger steering knuckle; the cooperative effect of these coincident alignments enables the front driver or passenger tie rod to control the directional orientation of the driver or passenger steering knuckle with minimal bump steer throughout suspension travel, receptively; and (2) the rear driver or passenger tie rod is positioned at the rear passenger or driver reverse power coupler in a manner such that the frame end of the rear driver or passenger tie rod is coincident with the first ends of the rear driver or passenger upper and lower leading links and the wheel end of the rear driver or passenger tie rod is coincident with ball joints; the ball joints serve pivotally connect the second ends of the rear driver or passenger upper and lower leading links to the top and bottom of the driver or passenger non-steering knuckle; the cooperative effect of these coincident alignments enables the rear driver or passenger tie rod to control the straight-ahead orientation of the driver or passenger non-steering knuckle with minimal change in toe throughout suspension travel, respectively;
controls the directional orientation of steering knuckles with a swinging motion whereby the frame ends of the front driver and passenger tie rods are pivotally connected to the bottoms the swingset and vertical bellcrank arms; the tops of the swig et and vertical bellcrank arms are pivotally connected to the front passenger and driver reverse power couplers with mounting brackets in a manner such that the bottoms of the swingset and vertical bellcrank arms are able to swing laterally thereby transmitting steering input to the front driver and passenger tie rods, which then is transmitted to the driver and passenger steering knuckles thereby making them turn, respectively;
controls the straight-ahead orientation of non-steering knuckles with a rigid attachment whereby the frame ends of the rear driver and passenger tie rods are pivotally connected to the rear passenger and driver reverse power couplers with mounting brackets; the rigid attachments of the mounting brackets to the rear passenger and driver reverse power couplers prevent any lateral motion by the rear driver and passenger tie rods thereby acting to lock the driver and passenger non-steering knuckles into a straight-ahead orientation, respectively.

BRIEF DESCRIPTION OF THE SEVERAL VIEWS OF THE DRAWING

List of Reference Numerals Utilized in the Drawings

10—frame
11—engine
12—transmission
13—transfer case
14—steering box
15—steering shaft
16—pitman arm
17—bellcrank
18—swingset arm
19—draglink
20—connector link
21—front driver tie rod
22—front passenger tie rod
23—rear driver tie rod
24—rear passenger tie rod
25—front differential housing
26—rear differential housing
27—offset power coupler
28—front drive shaft
29—rear drive shaft
30—driver short axle shaft
31—passenger short axle shaft
32—driver long axle shaft
33—passenger long axle shaft
34—driver upper leading link
35—driver lower leading link
36—passenger upper leading link
37—passenger lower leading link
38—driver upper trailing link
39—driver lower trailing link
40—passenger upper trailing link
41—passenger lower trailing link
42—driver steering knuckle
43—passenger steering knuckle
44—driver non-steering knuckle
45—passenger non-steering knuckle
46—driver differential housing mounting bracket
47—passenger differential housing mounting bracket

BRIEF DESCRIPTION OF THE DRAWINGS

Figure 1:
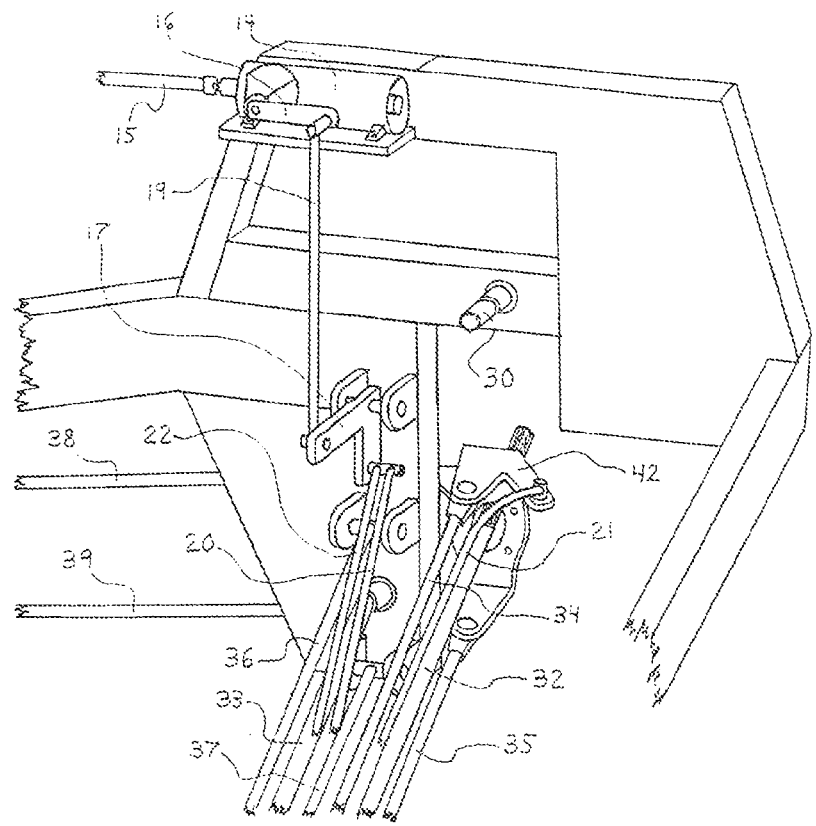
Figure 2:
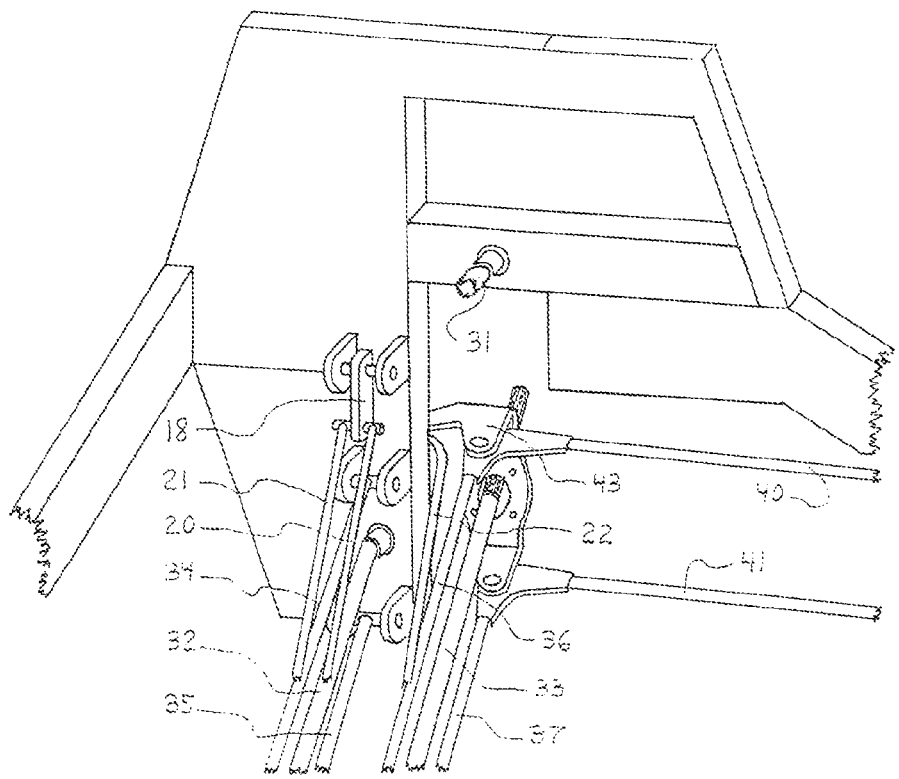
Figure 3:
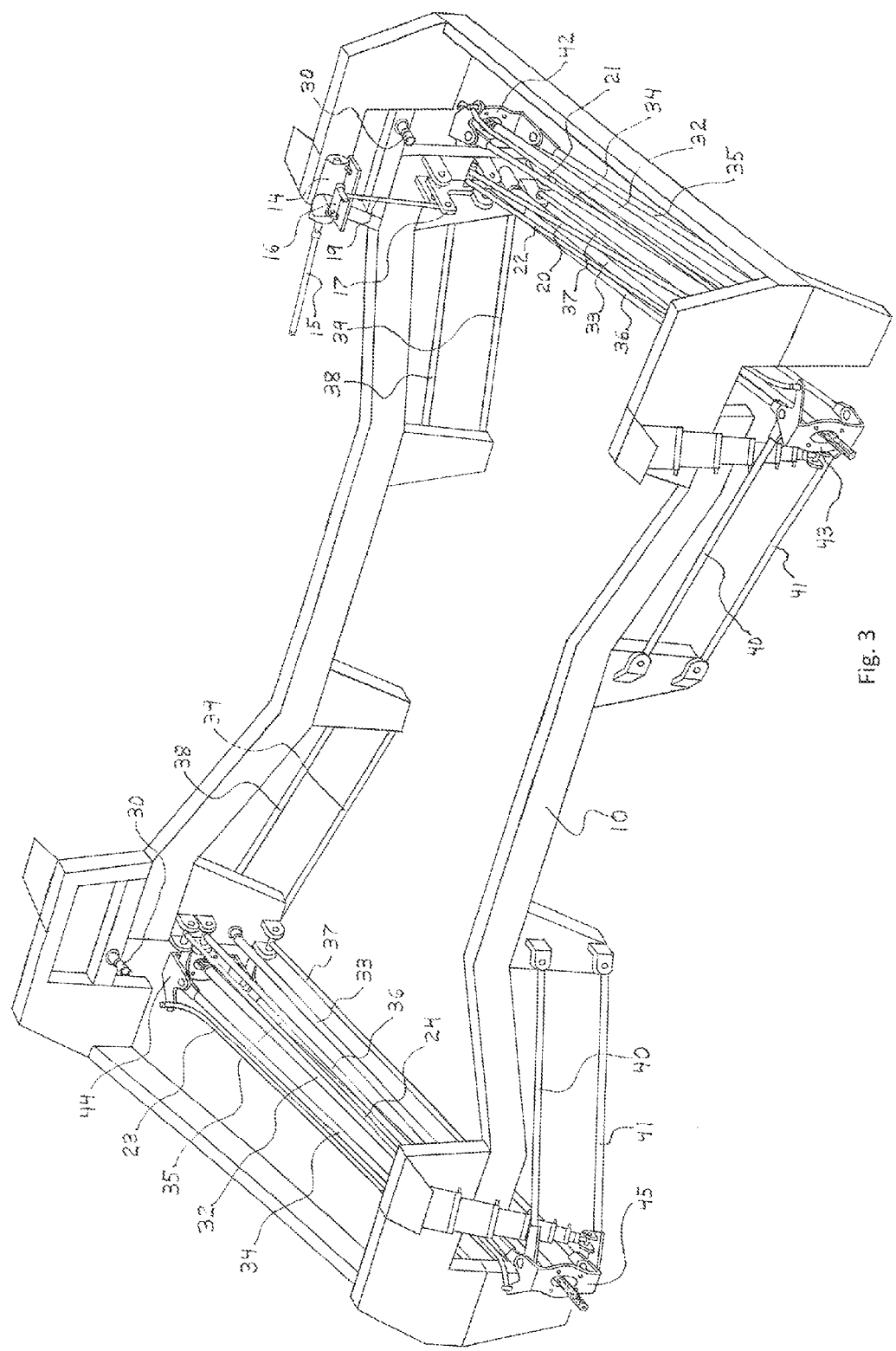
Figure 4:
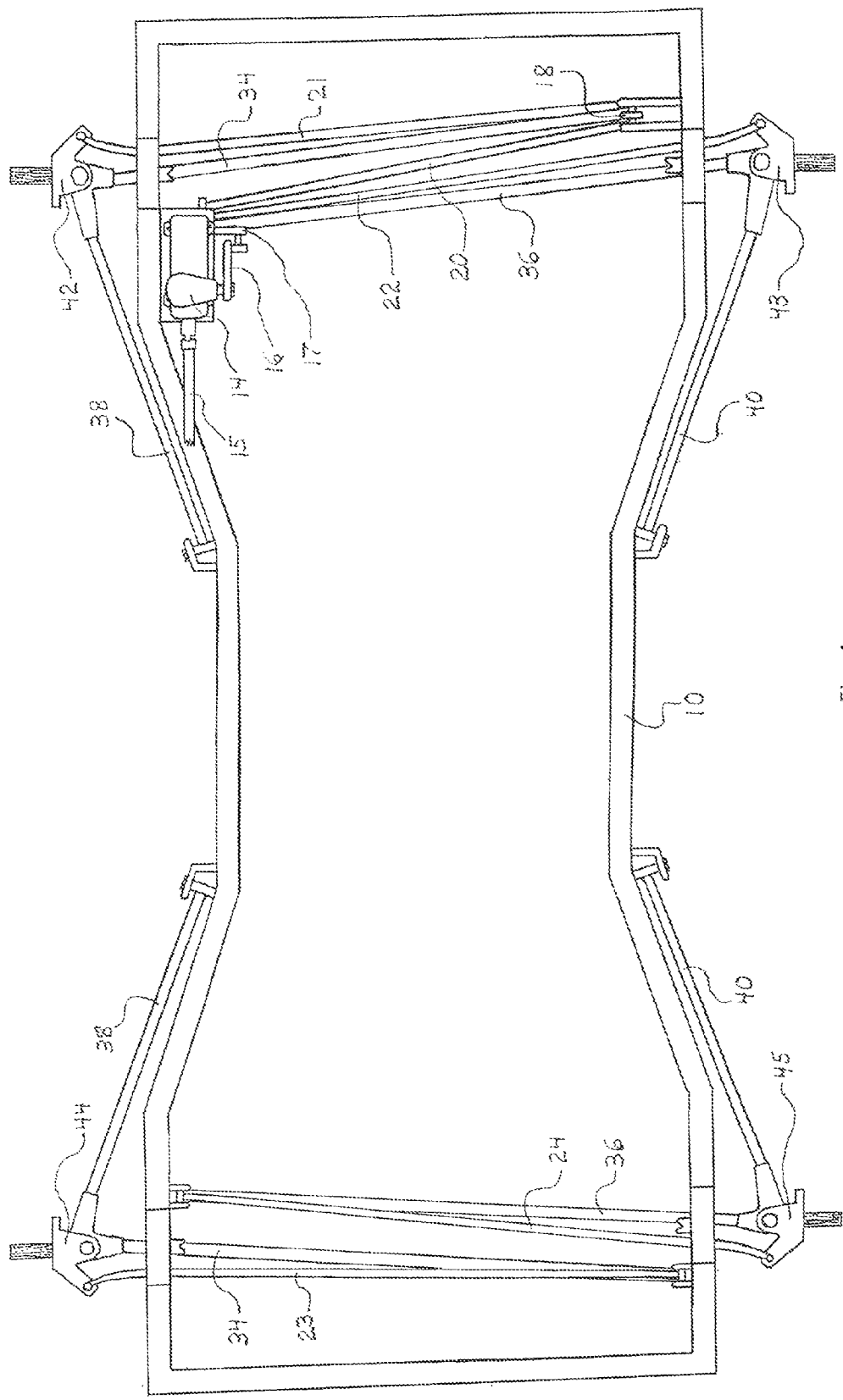
Figure 5:
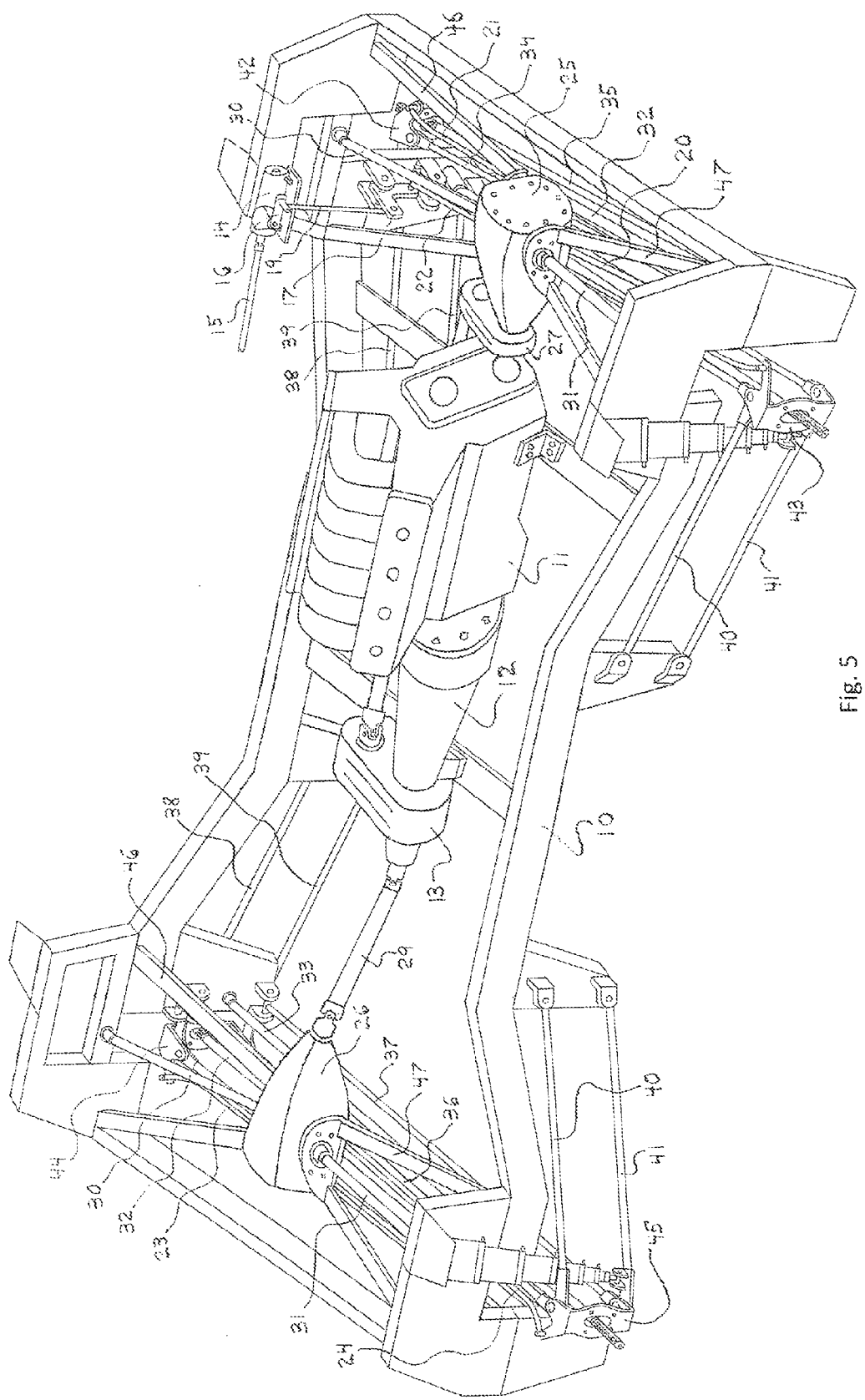
Figure 6:
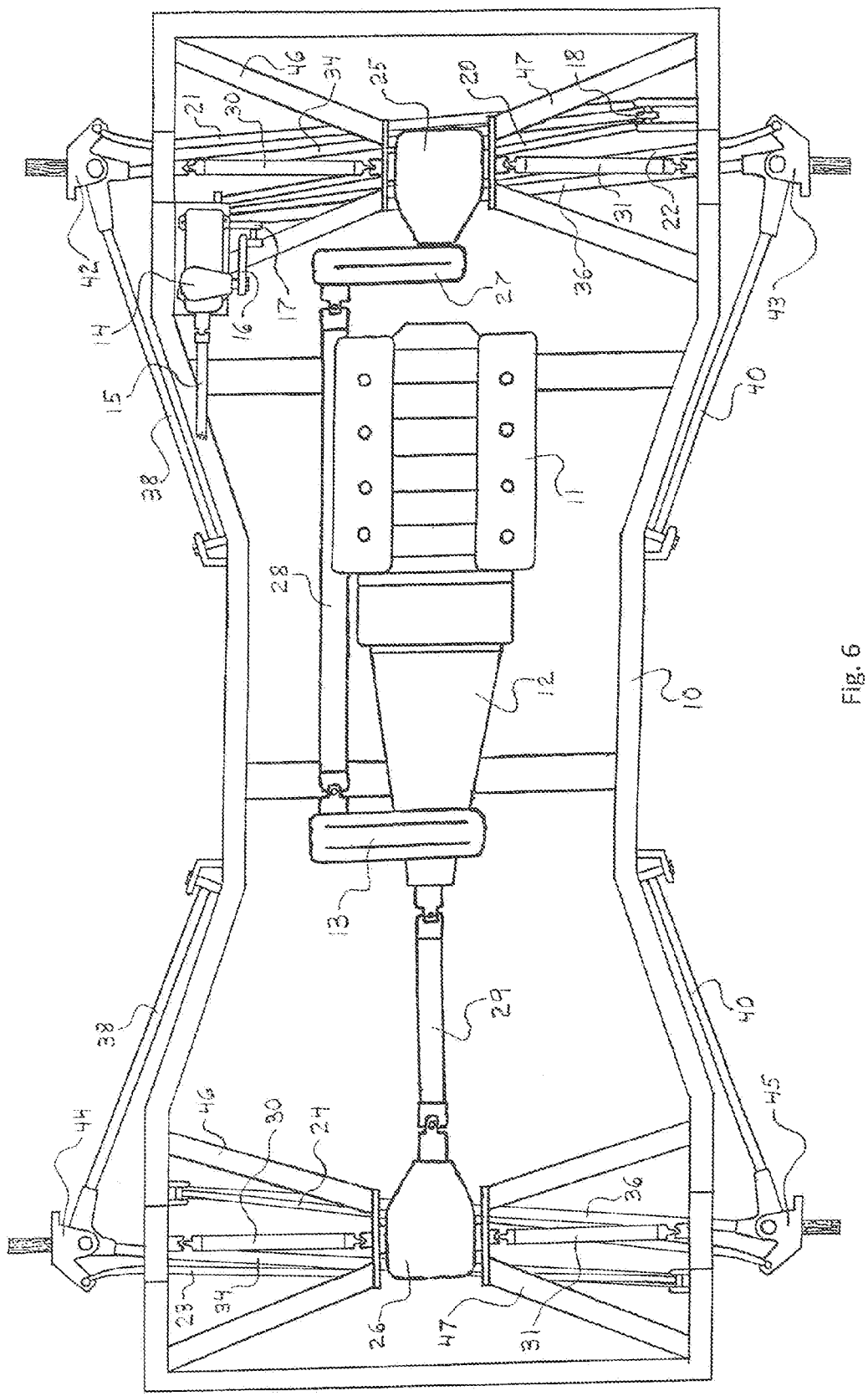
Figure 7:
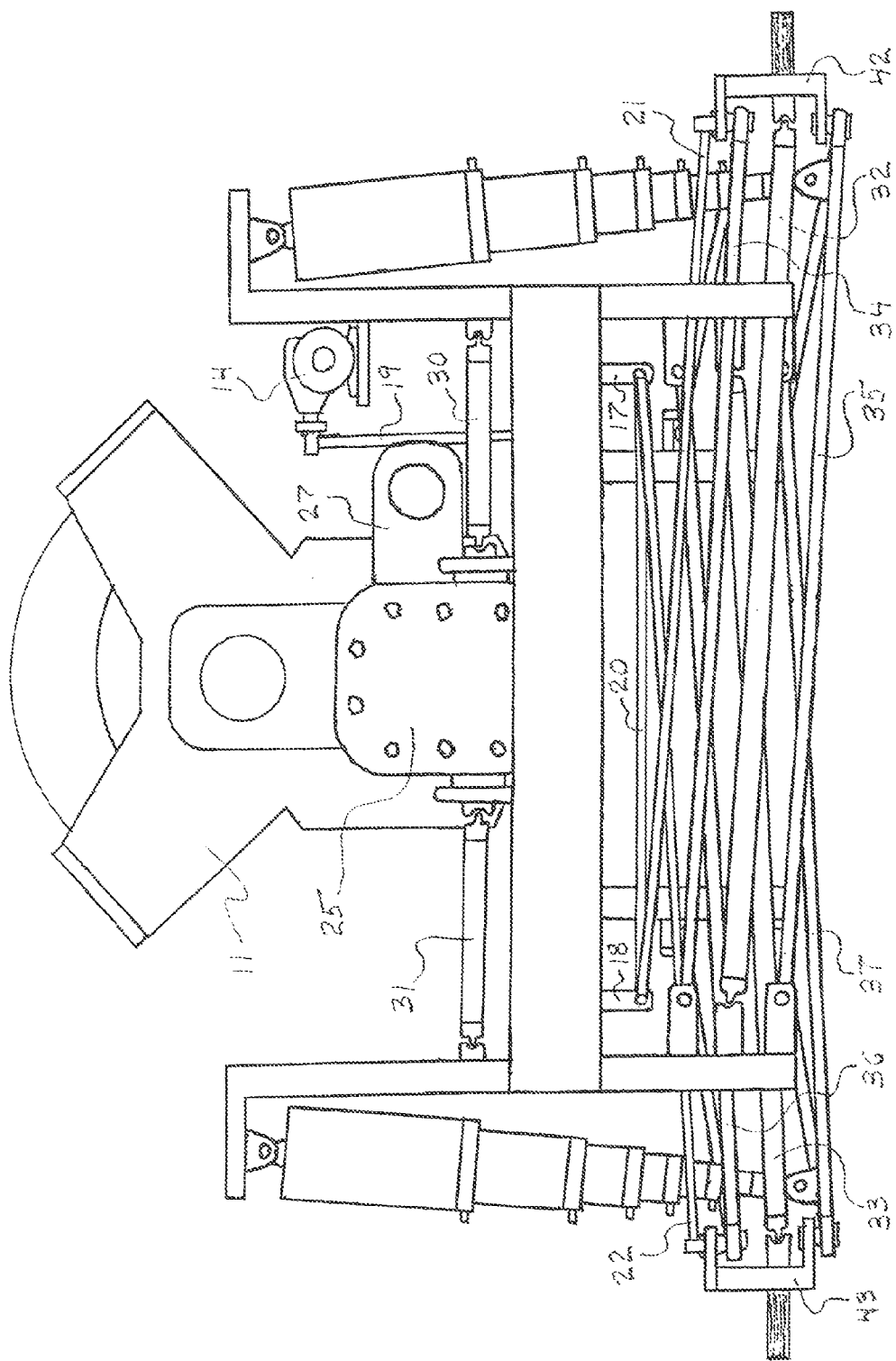
Figure 8:
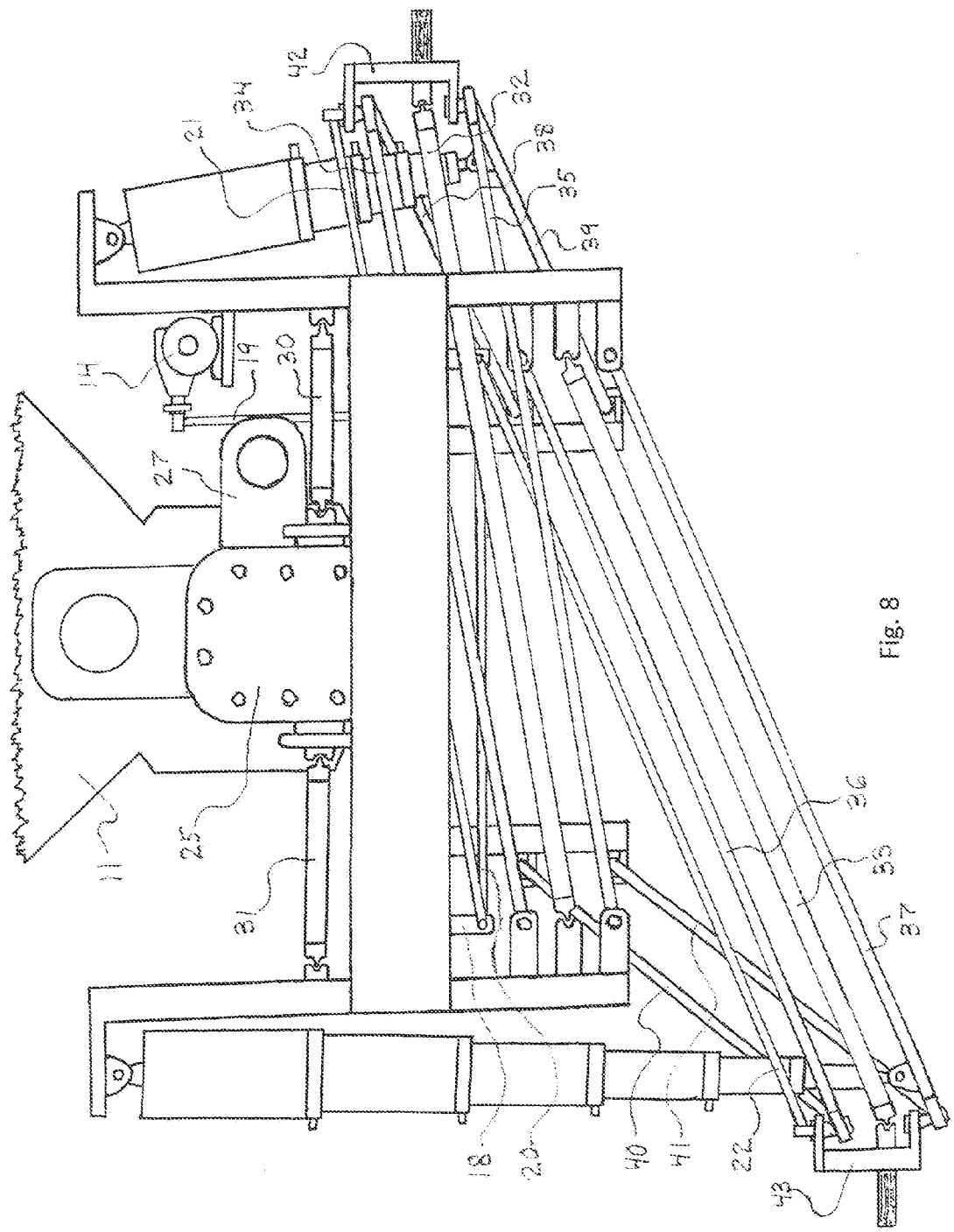

FIG. 1 is a close-up side perspective view of the front driver frame side steering components for a 4WD vehicle;
FIG. 2 is a close-up side perspective view of the front passenger frame side steering components thereof;
FIG. 3 is a side perspective view of the front and rear steering and suspension systems for a 4WD vehicle;
FIG. 4 a top plan view thereof;
FIG. 5 is a side perspective view of the chassis for a 4WD vehicle;
FIG. 6 a top plan view thereof;
FIG. 7 is a front view of the front end of the chassis at ride height thereof;
FIG. 8 is a front view of the front end of the chassis articulated thereof.

DETAILED DESCRIPTION OF THE INVENTION

The present invention represents a steering system designed to function with the powered version of the independent suspension system disclosed in U.S. patent application Ser. No. 14/087,552. The suspension system is based on Ford's twin I-beam front suspension system that incorporates a type of double A-arm configuration per wheel. The drivetrain includes a unique gearbox known as a reverse power coupler. Incorporated into the frame side, the reverse power coupler comprises external components including the input and output shafts and mounting brackets for the leading links in the suspension system.

Regarding the drawings, a steering system for a four-wheel drive vehicle is illustrated in detail and installed within a frame 10 in conjunction with a suspension system and drivetrain. Components of the steering system include a steering box 14, bellcrank 17, swingset arm 18 steering shaft 15, draglink 19, connector link 20, and front and rear driver and passenger tie rods 21 and 22, and 23 and 24, respectively. The steering system is arranged among the drivetrain components that include the front and rear differential housings 25 and 26, offset power coupler 27, and front and rear driver and passenger reverse power couplers, respectively. The drivetrain refers to the powertrain which includes an engine 11, transmission 12, and transfer case 13. The front or rear driver and passenger tie rods 21 and 22 or 23 and 24 are configured to interactively operate with the front or rear suspension system, each suspension system includes driver and passenger upper and lower leading links 34 and 35, and 36 and 37 and driver and passenger upper and lower trailing links 38 and 39, and 40 and 41, respectively.

Referring to FIGS. 3-6, the frame 10 with front and rear independent suspension systems and drivetrain for a 4WD vehicle is illustrated emphasizing in this case particularly the properties of the front and rear driver and passenger tie rods 21 and 22, and 23 and 24, respectively. These properties:

Involve the bellcrank 17 whereby bellcrank 17 consists of horizontal and vertical arms and has a right-angle shape such that the horizontal arm projects outward away from the inner frame side and towards the engine bay while the vertical arm hangs downward towards the ground. The horizontal and vertical arms are connected to each other at the apex such that the apex serves as the top of the vertical arm, the top of the vertical arm is pivotally connected to the driver reverse power coupler.

Involve the type of steering arm that is connected to the front or rear driver or passenger tie rod 21, 22, 23, or 24, respectively. The steering arm is located at the top portion of the driver or passenger steering or non-steering knuckle 42, 43, 44, or 45 in a manner commonly seen in a high steer kit whereby the steering arm is an integral part of the driver or passenger steering or non-steering knuckle 42, 43, 44, or 45, respectively. High steer kits are typically installed on a kingpin type of steering knuckle. By design the end of the steering arm projects outward away from the driver or passenger steering knuckle 42 or 43 and towards the front end of the vehicle and slightly inward towards the front differential housing 25, and from the driver or passenger non-steering knuckle 44 or 45 and towards the rear end of the vehicle and slightly inward towards the rear differential housing 26, respectively.

Are based on one tie rod per wheel, whereby: (1) the front driver and passenger tie rods 21 and 22 are pivotally connected to the bottoms of the swingset arm 18 and vertical bellcrank arm, respectively. A mounting bracket pivotally connects the top of the swingset arm 18 to the front passenger reverse power coupler, the location of the mounting bracket on the front passenger reverse power coupler serves to position the bottom of the swingset arm 18 in a manner such that the frame end of the front driver tie rod 21 is aligned with the first ends of the front driver upper and lower leading links 34 and 35 and the wheel end of the front driver tie rod 21 is aligned with ball joints, the ball joints serving to pivotally connect the second ends of the front driver upper and lower leading links 34 and 35 to the top and bottom of the driver steering knuckle 42, respectively. Likewise a mounting bracket pivotally connects the top of the vertical bellcrank arm to the front driver reverse power coupler the location of the mounting bracket on the front driver reverse serves to position the bottom of the vertical bellcrank arm in a manner such that the frame end of the front passenger tie rod 22 is aligned with the first ends of the front as and lower leading links 36 and 37 and the wheel end of the front passenger tie rod 22 is aligned with ball joints, the ball joints serving to pivotally connect the second ends of the front passenger upper and lower leading links 36 and 37 to the top and bottom of the passenger steering knuckle 43, respectively; (2) a mounting bracket pivotally connects the rear driver tie rod 23 to the rear passenger reverse power coupler, the location of the mounting bracket on the rear passenger reverse power coupler serves to align the frame end of the rear driver tie rod 23 with the first ends of the rear driver upper and lower leading links 34 and 35 and to align the wheel end of the rear driver tie rod 23 with ball joints, the ball joints serving to pivotally connect the second ends of the rear driver upper and lower leading links 34 and 35 to the top and bottom of the driver non-steering knuckle 44, respectively. Likewise a mounting bracket pivotally connects the rear passenger tie rod 24 to the rear driver reverse power coupler, the location of the mounting bracket on the rear driver reverse power coupler serves to align the frame end of the rear passenger tie rod 24 with the first ends of the rear passenger upper and lower leading links 36 and 37 and to align the wheel end of the rear passenger tie rod 24 with ball joints, the ball joints serving to pivotally connect the second ends of the rear passenger upper and lower leading links 36 and 37 to the top and bottom of the passenger non-steering knuckle 45, respectively; and (3) this alignment (a) refers to the frame end of the front driver or passenger tie rod 21 or 22 lying on a vertical line that passes through the first ends of the front driver or passenger upper and lower leading links 34 and 35 or 36 and 37 and to the wheel end of the front driver or passenger tie rod 21 or 22 occupying a vertical plane that is occupied by the ball joints, respectively; (b) refers to the frame end of the rear driver or passenger tie rod 23 or 24 lying on a vertical line that passes through the first ends of the rear driver or passenger upper lower leading links 34 and 35 or 36 and 37 and to the wheel end of the rear driver or passenger tie rod 23 or 24 occupying a vertical plane that is occupied by the ball joints respectively; wherein each vertical plane is parallel to the longitudinal axis, the longitudinal axis referring to a line passing through the center of the vehicle from front to back; and (c) enables the front driver or passenger tie rod 21 or 22 to be coincident with the front driver or passenger upper and lower leading links 34 and 35 or 36 and 37 such that bumpsteer is minimized throughout suspension travel, respectively; and, enables the rear driver or passenger tie rod 23 or 24 to be coincident with the rear driver or passenger upper and lower leading links 34 and 35 or 36 and 37 such that a change in toe is minimized throughout suspension travel, respectively.

Referring to FIGS. 1, 2, 7, & 8, there are close up illustrations of the front end of a 4WD vehicle with a front independent suspension system emphasizing in this case particularly the steering system interacting with the front independent suspension system. Affixed to the inner frame side above the bellcrank 17 is the steering box 14 whereby the input shaft of the steering box 14 is pivotally attached to the second end of the steering shaft 15 with a U-joint. This way, the U-joint attachment enables steering input to be transmitted from the steering shaft 15 to the steering box 14, whereby steering input originates at the steering wheel (not shown) and passes through the firewall (not shown) to the steering shaft 15 via a steering column (not shown) in a manner common in the art. The output shaft of the steering box is a sector shaft, the sector shaft projects outward away from the inner frame side and towards the engine bay, whereby the sector shaft is attached to a pitman arm 16. Positioned downward from the steering box 14 to the bellcrank 17 is the draglink 19. The draglink 19 has a top and bottom ends, whereby the top end is pivotally connected to the pitman arm 16 and the bottom end is pivotally connected to the horizontal bellcrank arm, thereby enabling the transmission of steering input from the steering box 14 to the bellcrank 17. The mounting bracket that pivotally connects the to of the vertical bellcrank arm to the front driver reverse power coupler positions the bellcrank 17 next to the front driver frame side aperture between the aperture and middle of the driver frame side in a manner such that the bottom of the vertical bellcrank arm can swing laterally within a vertical plane that parallels a line passing through the front wheels; whereas, the mounting bracket that pivotally connects the top of the swingset arm 18 to the front passenger reverse power couple positions the swingset arm 18 next to the front passenger frame side aperture between the aperture and front end of the passenger frame side in a manner such that the bottom of the swingset arm 18 can swing laterally within a vertical plane that parallels a line passing through the front wheels. This lateral swinging motion creates the lateral force that transmits steering input from the bellcrank 17 and swingset arm 18 to the passenger and driver tie rods 22 and 21, respectively.

The first and second ends of the connector link 20 are pivotally connected to the bottoms of the vertical bellcrank arm and swingset arm 18 thereby enabling the transmission of steering input from the bellcrank 17 to the swingset arm 18, respectively. The bottoms of the vertical bellcrank arm and swingset arm 18 are also pivotally connected to the frame ends of the front passenger and driver tie rods 22 and 21 thereby enabling the transmission of steering input from the bellcrank 17 and swingset arm 18 to the front passenger and driver tie rods 22 and 21, respectively. The wheel ends of the front driver and passenger tie rods 21 and 22 are pivotally connected to the steering arms of the driver and passenger steering knuckles 42 and 43 thereby enabling the transmission of steering input from the front driver and passenger tie rods 21 and 22 to the driver and passenger steering knuckles 42 and 43 which then causes the driver and passenger steering knuckles 42 and 43, respectively, to turn.

Referring to FIGS. 3-6, the frame 10 with front and rear independent suspension systems and drivetrain for a 4WD vehicle is illustrated emphasizing in this case particularly components of the steering system interacting with the rear independent suspension system. The mounting bracket that pivotally connects the frame end of the rear driver tie rod to the rear passenger reverse power coupler is positioned next to the rear passenger frame side aperture between the aperture and rear end of the passenger frame side while the mounting bracket that pivotally connects the frame end of the rear passenger tie rod to the rear driver reverse power coupler is positioned next to the rear driver frame side aperture between the aperture and middle of the driver frame side. The wheel ends of the rear driver and passenger tie rods 23 and 24 are pivotally connected to the steering arms of the driver and passenger non-steering knuckles 44 and 45. Since the frame end of the rear driver or passenger tie rod 23 or 24 is only able to pivot within its mounting bracket, the rear driver or passenger tie rod 23 or 24 travels up and down in concert with the rear driver or passenger upper and lower leading links 34 and 35 or 36 and 37, respectively, without any lateral movement. The lack of lateral movement by the rear driver or passenger tie rod 23 or 24 prevents the driver or passenger non-steering knuckle 44 or 45, respectively, from turning thereby locking it into a straight-ahead orientation.

While the invention has been illustrated and described as embodied in a vehicle steering system, it is not intended to be limited to the details shown, since it will be understood that various omissions, modifications, substitutions and changes in the forms and details of the device illustrated and in its operation can be made by those skilled in the art without departing in any way from the scope and spirit of the present invention.

What is claimed is:

1. A steering system for use with a vehicle having a frame, front and rear independent suspension systems, and drivetrain, the steering system comprising:
   wherein the frame comprises a driver frame side and a passenger frame side;
   a steering box having an input shaft and a sector shaft; wherein the steering box is affixed to a front driver inner frame side;
   a steering shaft having a first end and a second end;
   a pitman arm;
   a right-angle bellcrank having horizontal and vertical arms; wherein the vertical arm has top and bottom ends;
   a swingset arm having top and bottom ends;
   a draglink having top and bottom ends;
   a connector link having a first end and a second end;
   front and rear driver and passenger tie rods, each tie rod has frame and wheel ends; wherein the frame end of the front driver tie rod is pivotally connected to the bottom of the swingset arm and the frame end of the front passenger tie rod is pivotally connected to the bottom of the vertical bellcrank arm, whereas the wheel end of each tie rod is pivotally connected to an end of a steering arm;
   wherein the front independent suspension system includes a driver side knuckle and a passenger side knuckle, each knuckle including an integral steering arm, wherein said front independent suspension system is steerable;
   wherein the rear independent suspension system includes a driver side knuckle and a passenger side knuckle, each knuckle including an integral steering arm, wherein said rear independent suspension system is non-steerable;
   wherein the front and rear independent suspension systems each possess driver upper and lower leading links passenger upper and lower leading links, driver upper and lower trailing links, and passenger upper and lower trailing links, each link has a first end and a second end;
   wherein the drivetrain includes front and rear driver and passenger reverse power couplers;
   wherein each driver or passenger frame side has a pair of apertures, an aperture is located at a front and rear ends of the frame side;
   wherein all pivotal connections or attachments are made with flexible joints.

2. The steering system of claim 1, wherein the right-angle bellcrank has a right-angle shape such that the horizontal bellcrank arm projects outward away from the front driver inner frame side and towards an engine bay while the vertical bellcrank arm hangs downward towards a ground; wherein the horizontal and vertical bellcrank arms are connected to each other at an apex such that the apex serves as the top of the vertical bellcrank arm the top of the vertical bellcrank arm is pivotally connected to the front driver reverse power coupler, the connection locating the bellcrank below the steering box.

3. The steering system of claim 1 or 2, wherein the input shaft of the steering box is pivotally attached to the second end of the steering shaft with a flexible joint thereby enabling steering input to be transmitted from the steering shaft to the steering box, steering input is transmitted from a steering wheel to the steering shaft via a steering column in the manner common in the art; wherein the steering box is affixed to the front driver inner frame side above the bellcrank such that the input shaft is directed backward towards a firewall and the sector shaft is directed away from the frame side and towards the engine bay, the sector shaft is attached to the pitman arm such that the pitman arm is directed forward towards the front of the vehicle paralleling the input shaft; wherein the draglink is positioned downward from the steering box to the bellcrank such that the top end is pivotally connected to the pitman arm and the bottom end is pivotally connected to the horizontal bellcrank arm; wherein steering input is transmitted from the pitman arm through the draglink to the horizontal bellcrank arm thereby enabling steering input to be transmitted from the steering box to the bellcrank.

4. The steering system of claim 1, wherein a mounting bracket pivotally connects the to of the swingset arm to the front passenger reverse power coupler; wherein the location of the mounting bracket on the front passenger reverse power coupler serves to position the bottom of the swingset arm in a manner such that the frame end of the front driver tie rod is aligned with the first ends of the front driver upper and lower leading links and the wheel end of the front driver tie rod is aligned with flexible joints, the flexible joints serve to pivotally connect the second ends of the front driver upper and lower leading links to the top and bottom of the driver steering knuckle, respectively; wherein the alignment refers to the frame end of the front driver tie rod lying on a vertical line that passes through the first ends of the front driver upper and lower leading links and to the wheel end of the front driver tie rod occupying a vertical plane that is occupied by the flexible joints;

wherein a mounting bracket pivotally connects the top of the vertical bellcrank arm to the front driver reverse power coupler; wherein the location of the mounting bracket on the front driver reverse power coupler serves to position the bottom of the vertical bellcrank arm in a manner such that the frame end of the front passenger tie rod is aligned with the first ends of the front passenger upper and lower leading links and the wheel end of the front passenger tie rod is aligned with flexible joints, the flexible joints serve to pivotally connect the second ends of the front passenger upper and lower leading links to the too and bottom of the passenger steering knuckle, respectively; wherein the alignment refers to the frame end of the front passenger tie rod lying on a vertical line that passes through the first ends of the front passenger upper and lower leading links and to the wheel end of the front passenger tie rod occupying a vertical plane that is occupied by the flexible joints;

wherein a mounting bracket pivotally connects the frame end of the rear driver tie rod to the rear passenger reverse power coupler, the location of the mounting bracket on the rear passenger reverse power coupler serves to align the frame end of the rear driver tie rod with the first ends of the rear driver upper and lower leading links and to align the wheel end of the rear driver tie rod with flexible joints, the flexible joints serve to pivotally connect the second ends of the rear driver upper and lower leading links to the toy and bottom of the driver non-steering knuckle, receptively; wherein the alignment refers to the frame end of the rear driver tie rod lying on a vertical line that passes through the first ends of the rear driver upper and lower leading links and to the wheel end of the rear driver tie rod occupying a vertical plane that is occupied by the flexible joints;

wherein a mounting bracket pivotally connects the frame end of the rear passenger tie rod to the rear driver reverse power coupler, the location of the mounting bracket on the rear driver reverse power coupler serves to align the frame end of the rear passenger tie rod with the first ends of the rear passenger upper and lower leading links and to align the wheel end of the rear passenger tie rod with flexible joints, the flexible joints serve to pivotally connect the second ends of the rear passenger upper and lower leading links to the top and bottom of the passenger non-steering knuckle, respectively; wherein the alignment refers to the frame end of the rear passenger tie rod lying on a vertical line that passes through the first ends of the rear passenger upper and lower leading links and to the wheel end of the rear passenger tie rod occupying a vertical plane that is occupied by the flexible joints;

wherein each vertical plane is parallel to the longitudinal axis, the longitudinal axis referring to a line passing through the center of the vehicle from front to back.

5. The steering system of claim 1 or 4, wherein the mounting bracket that pivotally connects the top of the vertical bellcrank arm to the front driver reverse power coupler positions the bellcrank next to the front driver frame side aperture between the aperture and a middle of the driver frame side in a manner such that the bottom of the vertical bellcrank arm can swine laterally within a vertical plane that parallels a line passing through the front wheels thereby acting to transmit steering input from the bellcrank to the front passenger tie rod; wherein the mounting bracket that pivotally connects the top of the swingset arm to the front passenger reverse power coupler positions the swingset arm next to the front passenger frame side aperture between the aperture and front end of the passenger frame side in a manner such that the bottom of the swingset arm can swing laterally within a vertical plane that parallels a line passing through the front wheels thereby acting to transmit steering input from the swingset arm to the front driver tie rod.

6. The steering system of claim 1 or 4, wherein the mounting bracket that pivotally connects the frame end of the rear driver tie rod to the rear passenger reverse power coupler is positioned next to the rear passenger frame side aperture between the aperture and rear end of the passenger frame side while the mounting bracket that pivotally connects the frame end of the rear passenger tie rod to the rear driver reverse power coupler is positioned next to the rear driver frame side aperture between the aperture and middle of the driver frame side;

wherein the frame end of the rear driver tie rod is only able to pivot within its mounting bracket in a manner such that the rear driver tie rod can travel up and down in concert with the rear driver upper and lower leading links without any lateral movement, the lack of lateral movement by the rear driver tie rod prevents the driver non-steering knuckle from being able to turn thereby locking it into a straight-ahead orientation; wherein the frame end of the rear passenger tie rod is only able to pivot within its mounting bracket in a manner such that the rear passenger tie rod can travel up and down in concert with the rear passenger upper and lower leading links without any lateral movement, the lack of lateral movement by the rear passenger tie rod prevents the passenger non-steering knuckle from being able to turn thereby locking it into a straight-ahead orientation.

7. The steering system of claim 1, wherein the first end of the connector link is pivotally connected to the bottom of the vertical bellcrank arm while the second end of the connector link is pivotally connected to the bottom of the swingset arm thereby enabling the transmission of steering input from the bellcrank to the swingset arm;

wherein steering input is able to be transmitted from the swingset will to the front driver tie rod due to the bottom of the swingset arm being pivotally connected to the frame end of the front driver tie rod while steering input is able to be transmitted from the bellcrank to the front passenger tie rod due to the bottom of the vertical bellcrank arm being pivotally connected to the frame end of the front passenger tie rod;

wherein the wheel end of the front driver tie rod is pivotally connected to the steering arm of the driver steering knuckle thereby enabling steering input to be transmitted from the front driver tie rod to the driver steering knuckle which then causes the driver steering knuckle to turn; wherein the wheel end of the front passenger tie rod is pivotally connected to the steering arm of the passenger steering knuckle thereby enabling steering input to be transmitted from the front passenger tie rod to the passenger steering knuckle which then causes the passenger steering knuckle to turn.

\* \* \* \* \*